United States Patent
Yuasa (10) Patent No.: US 8,018,488 B2
(45) Date of Patent: Sep. 13, 2011

(54) VEHICLE-PERIPHERY IMAGE GENERATING APPARATUS AND METHOD OF SWITCHING IMAGES

(75) Inventor: Mizuki Yuasa, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 1114 days.

(21) Appl. No.: 11/767,939

(22) Filed: Jun. 25, 2007

(65) Prior Publication Data

US 2008/0007618 A1    Jan. 10, 2008

(30) Foreign Application Priority Data

Jul. 5, 2006   (JP) ................................ 2006-185175

(51) Int. Cl.
*H04N 7/00* (2006.01)
*H04N 7/18* (2006.01)
*B60Q 1/48* (2006.01)
*G08G 1/14* (2006.01)

(52) U.S. Cl. ........................ 348/118; 348/119; 340/932.2
(58) Field of Classification Search ........................ None
See application file for complete search history.

(56) References Cited

U.S. PATENT DOCUMENTS

| 6,940,423 B2* | 9/2005 | Takagi et al. ............. 340/932.2 |
| 7,161,616 B1* | 1/2007 | Okamoto et al. ............. 348/148 |
| 7,684,593 B2* | 3/2010 | Chinomi ....................... 382/104 |
| 7,706,944 B2* | 4/2010 | Tanaka et al. ................... 701/41 |
| 2006/0215020 A1* | 9/2006 | Mori et al. .................... 348/119 |
| 2007/0057816 A1* | 3/2007 | Sakakibara et al. ....... 340/932.2 |

FOREIGN PATENT DOCUMENTS

JP         2002-109697        4/2007

* cited by examiner

*Primary Examiner* — John B. Walsh
(74) *Attorney, Agent, or Firm* — Brinks Hofer Gilson & Lione (57) ABSTRACT

A vehicle-periphery image generating apparatus and an image switching method which provides a rear view image displayed additionally from a vehicle-periphery image is presented at an adequate timing with eye-friendliness. There are provided a parallel detector for detecting that a vehicle is oriented substantially parallel to a parking space, an approach detector for detecting that at least part of the vehicle is entering the parking space, and a display controller for switching display of an image from a vehicle-periphery image to a rear view image when the vehicle is oriented substantially parallel to the parking space and at least part of the vehicle is approaching into the parking space, so that the vehicle-periphery image and the rear view image are switched and displayed as needed according to the state of the vehicle with respect to the parking space and images optimal for respective scenes are displayed over the full screen.

20 Claims, 6 Drawing Sheets

VEHICLE-PERIPHERY IMAGE GENERATING APPARATUS AND METHOD OF SWITCHING IMAGES

RELATED APPLICATIONS

The present application claims priority to Japanese Patent Application Serial No. 2006-185175, filed on Jul. 5, 2006, the entirety of which is hereby incorporated by reference.

BACKGROUND OF THE INVENTION

1. Field of the Invention

The present invention relates to a vehicle-periphery image generating apparatus and a method of switching images and is specifically suitable for being used in a vehicle-periphery image generating apparatus that generates a vehicle-periphery image viewed from a virtual point of view above a vehicle and additional images different from the same.

2. Description of the Related Art

In the related art, there is provided a technology of generating and displaying vehicle-periphery images viewed from a virtual point of view above the vehicle by installing a plurality of cameras on the vehicle at front, rear, left and right thereof, and applying point-of-view conversion on images of the periphery of the vehicle shot by the plurality of cameras. A driver is able to know the positional relation between his/her own-vehicle and obstacles therearound by confirming the vehicle-periphery image displayed in a display device on the user's own-vehicle and drive the own-vehicle while preventing collisions or the like between the own-vehicle and the obstacles.

In general, a shooting range in front of the vehicle is shot by a front camera arranged at the front of the vehicle. A shooting range on the left hand side of the vehicle is shot by a left side camera arranged at the left side of the vehicle. A shooting range on the right hand side of the vehicle is shot by a right side camera arranged at the right side of the vehicle. A shooting range behind the vehicle is shot by a rear camera arranged at the back of the vehicle. Then on the basis of the front, left side, right side, and rear images shot by the respective cameras, a vehicle-periphery image is generated.

There exists a system in which a display screen is divided so that an additional image different from the vehicle-periphery image is displayed as well as the vehicle-periphery image as an assistance for driving (For example, see Japanese Unexamined Patent Application Publication No. 2002-109697). In Japanese Unexamined Patent Application Publication No. 2002-109697, a technique in which the display screen is divided and an image which can view the state behind the vehicle is displayed as an additional image in one of the areas when the shift position is, for example, a backward gear is described.

However, in the technique described in Japanese Unexamined Patent Application Publication No. 2002-109697, there is a problem in that the surface area of the display screen for one image is small since the display screen is divided into two screens for the vehicle-periphery image and the additional image and hence is not eye-friendly or easy to view. In particular, the additional image for viewing the state behind the vehicle is required to display the area behind the vehicle which is hard to view via a mirror or directly when traveling backward in detail. However, since the additional image is displayed in a divided small size, there exists a problem that the display is not eye-friendly or easily viewed or comprehended.

SUMMARY OF THE INVENTION

In order to solve the problem described above, it is an object of the invention to provide an image displayed additionally from a vehicle-periphery image is presented at an adequate or appropriate timing with eye-friendliness and ease of viewing.

In order to solve the above-described problem, in the invention, display of images is switched from a vehicle-periphery image to an additional image when either one of (1) a vehicle is oriented substantially parallel to a parking space, and (2) at least part of the vehicle is entering or approaching into the parking space is detected. It is also applicable to switch the display from the vehicle-periphery image to the additional image when (3) the steering angle of a steering wheel or other handle of the vehicle is within a certain angular range is further detected.

According to the invention configured as described above, the vehicle-periphery image and the additional image are switched as needed on the display screen according to the state of the vehicle with respect to the parking space on the basis of the result of detection whether or not the three conditions (1) to (3) are satisfied. Accordingly, images optimal for respective scenes are displayed over the full screen. Therefore, for example, when a driver wants to know the positional relationship between the vehicle and the wheel stoppers located in the periphery thereof accurately, an additional image in which a portion near the wheel stoppers is shown in detail is displayed largely on the screen. In this manner, according to the invention, an image displayed additionally from the vehicle-periphery image may be presented at an adequate timing with eye-friendliness or ease of viewing.

DESCRIPTION OF THE PREFERRED EMBODIMENTS

Figure 1:
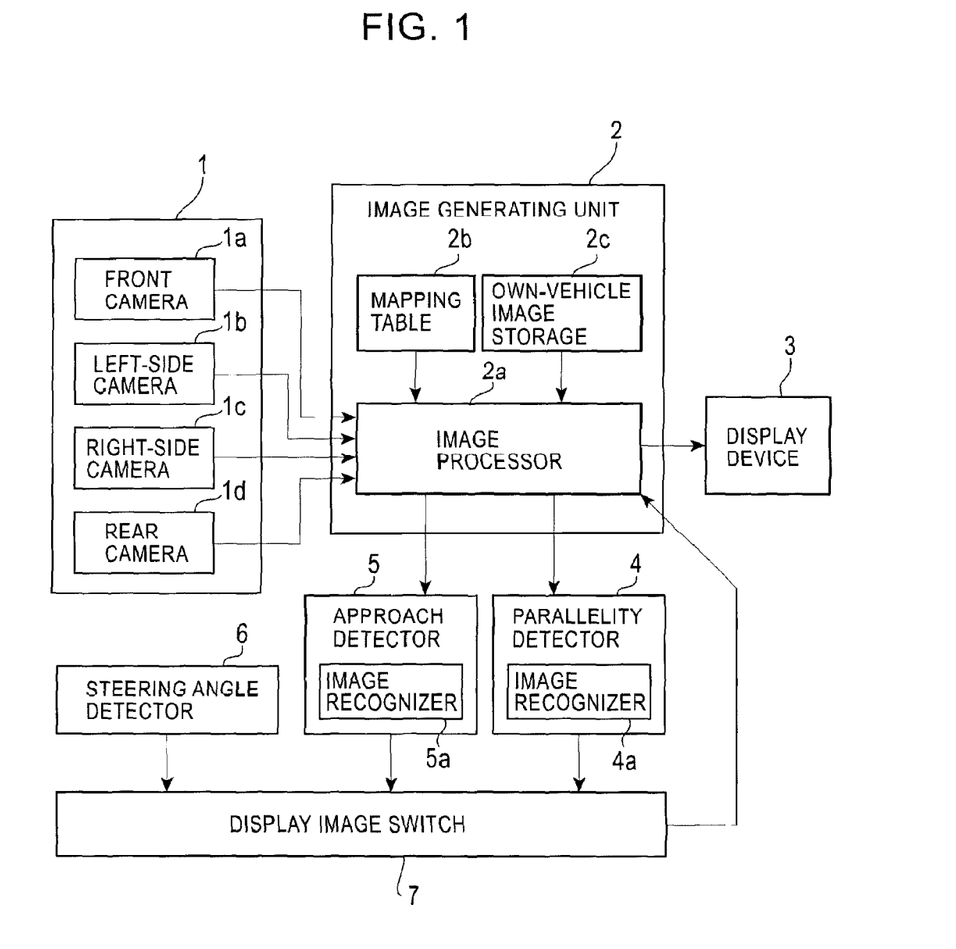
FIG. 1 is a block diagram showing an example of the configuration of a vehicle-periphery image generating apparatus in this embodiment.

Referring now to the drawings, an embodiment of the invention will be described. FIG. 1 is a block diagram showing an exemplary configuration of a vehicle-periphery image generating apparatus in this embodiment. In FIG. 1, reference numeral 1 designates a plurality of image pickup devices installed at different locations of a vehicle, which includes a front camera 1a for shooting the front of the vehicle, a left side camera 1b for shooting the left hand side of the vehicle, a right side camera 1c for shooting the right hand side of the vehicle, and a rear camera 1d for shooting behind the vehicle.

Figure 2:
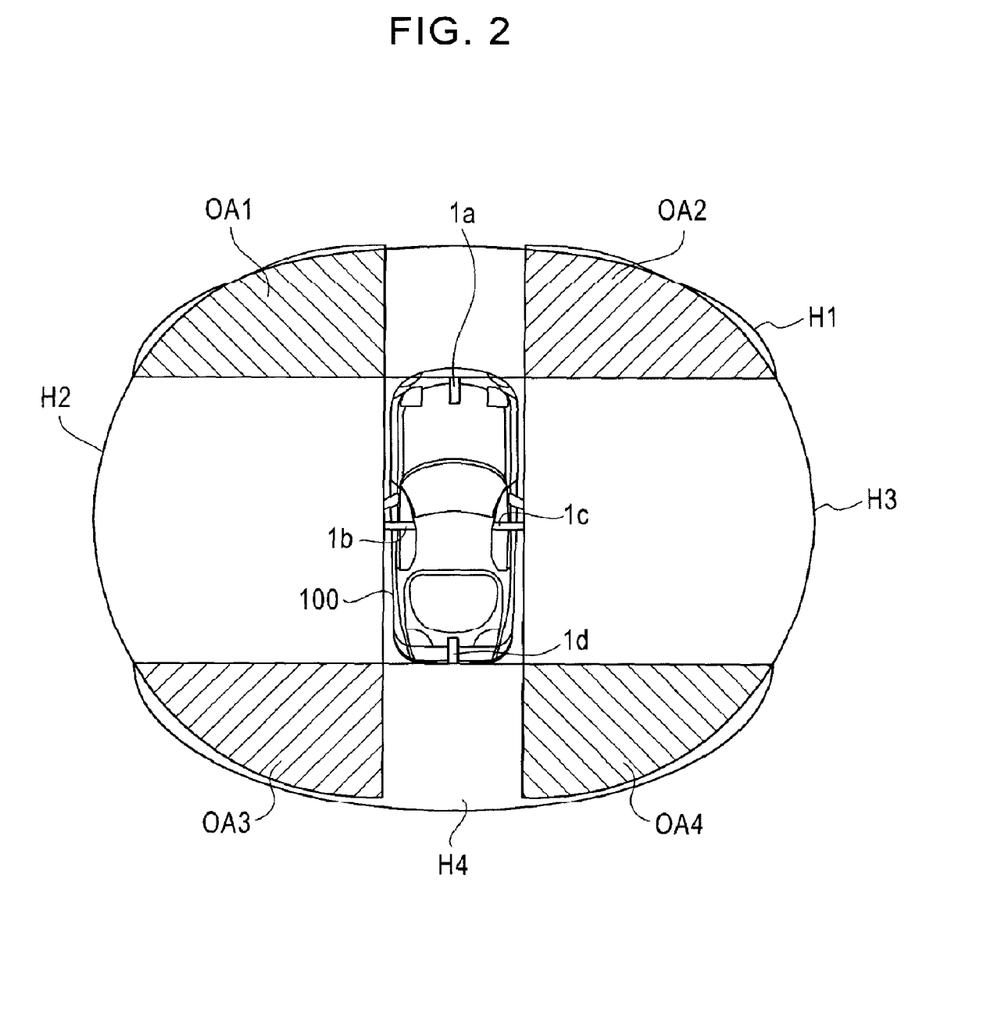
FIG. 2 is a drawing showing an example of camera arrangement and shooting ranges of respective cameras.

FIG. 2 is a drawing showing an example of an arrangement of the respective cameras or other image pickup devices 1a to 1d and the shooting ranges. In FIG. 2, the front camera 1a is arranged at the front of a vehicle 100 for shooting a shooting range H1 in front. The left side camera 1b is arranged on the left hand side of the vehicle 100 for shooting a shooting range H2 on the left hand side. The right side camera 1c is arranged on the right hand side of the vehicle 100 for shooting a shooting range H3 on the right hand side. The rear camera 1d is arranged at the back of the vehicle 100 for shooting a shooting area H4 behind the vehicle 100.

The shooting range H1 in front is overlapped with the shooting range H2 on the left hand side in a part OA1, and the shooting range H1 in front is overlapped with the shooting range H3 on the right hand side in a part OA2. The shooting range H4 behind the vehicle is overlapped with the shooting range H2 on the left hand side in a part OA3. The shooting range H4 behind the vehicle is overlapped with the shooting range H3 on the right hand side in a part OA4.

Reference numeral 2 designates an image generating unit, and includes an image processor 2a, a mapping table storage 2b, and a vehicle image storage 2c. The image processor 2a inputs images of the periphery of the vehicle shot by the respective cameras 1a to 1d and generates a background image of the periphery of the vehicle 100 viewed from a virtual point of view existing above according to conversion information stored in the mapping table storage 2b.

Here, the background image is generated by combining a front vehicle-periphery image generated by converting the point of view of the image shot by the front camera 1a, a left side vehicle-periphery image generated by converting the point of view of the image shot by the left side camera 1b, a right side vehicle-periphery image generated by converting the point of view of the image shot by the right side camera 1c, and a rear vehicle-periphery image generated by converting the point of view of the image shot by the rear camera 1d.

The mapping table storage 2b is a table of the correspondence relation between pixel data of images shot by the respective cameras 1a to 1d and pixel data of the background image of a portion in the periphery of the vehicle 100 viewed from a virtual point of view above the vehicle, in which conversion information which indicates to which pixel of the background image each pixel of a shot image corresponds is written. The vehicle image storage 2c stores the vehicle image, which shows a form of the vehicle 100 when viewed from above and is read out by the image processor 2a. The image processor 2a generates a vehicle-periphery image of the vehicle 100 viewed from a virtual point of view above the vehicle 100 by combining the vehicle image to the substantially center of the above-described background image.

The image processor 2a also generates an additional image different from the above-described vehicle-periphery image on the basis of one of the images of the periphery of the vehicle shot by the respective cameras 1a to 1d. For example, as the additional image, the rear vehicle-periphery image obtained by converting the point of view of the image shot by the rear camera 1d is generated. The additional image may be an image shot by the rear camera 1d before converting the point of view, an image before converting the point of view whose distortion is corrected, or a partly enlarged image of these images. The additional image generated on the basis of the image shot by the rear camera 1d is referred to as "rear view image", hereinafter.

Reference numeral 3 designates a display device for displaying the vehicle-periphery image generated by the image processor 2a and the additional image. Normally, the vehicle-periphery image is displayed over the full screen of the display device 3. When predetermined conditions described later are satisfied, display of the image is switched from the vehicle-periphery image to the rear view image, so that the rear view image is displayed over the full screen of the display device 3.

Reference numeral 4 designates a parallel or parallelity detector for detecting that the vehicle 100 is oriented substantially parallel to the parking space. The parallel or parallelity detector 4 includes an image recognizer 4a. The image recognizer 4a performs image recognition processing for the images of the periphery of the vehicle shot by the respective cameras 1a to 1d or the vehicle-periphery image generated therefrom by the image processor 2a. The parallel detector 4 utilizes the result of the image recognition processing to detect that the vehicle 100 is oriented substantially parallel to the parking space.

Figure 3A:
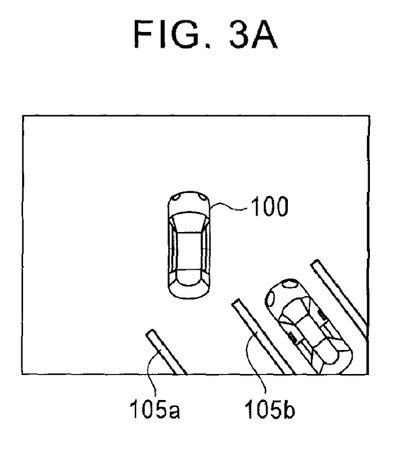
FIGS. 3A and 3B are drawings showing examples of the positional relationships between a vehicle and a parking space.
Figure 3B:
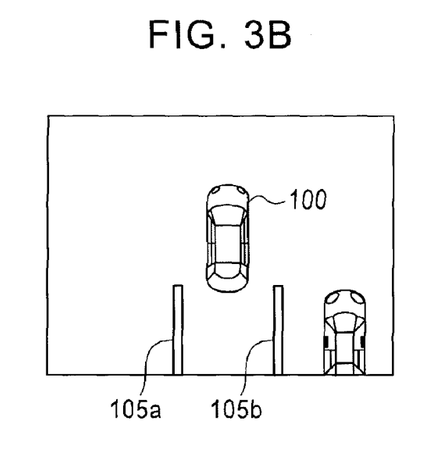

In other words, since two parallel white lines or yellow lines are drawn at least in the longitudinal direction of the parking space, the parallel detector 4 specifies these two parallel boundary lines by the image recognition of the image recognizer 4a. Then, the parallel detector 4 compares the lengths of these two boundaries. As shown in FIG. 3A, when the vehicle 100 is not substantially parallel to the parking space, the lengths of two parallel boundaries 105a and 105b in the image are not the same. In contrast, when the vehicle 100 is oriented substantially in parallel with the parking space, the lengths of the two parallel boundaries 105a and 105b in the image are substantially the same as shown in FIG. 3B. Then, the parallel detector 4 detects that the vehicle 100 is substantially parallel to the parking space on the basis of the fact that the lengths of the two parallel boundaries 105a and 105b specified by the image recognition of the image recognizer 4a are the same.

When the parking space is oriented obliquely, the lengths of the two parallel lines in the image are not equal even though the vehicle 100 is substantially parallel to the parking space. Therefore, the method shown above is not effective for the oblique parking space. As a method effective also for the oblique parking space, there is a method shown below. As described above, since the white lines or the yellow lines parallel to each other are drawn in the parking space, the position and the orientation of the parking space may be specified by the image recognition. The longitudinal direction of the vehicle image, which is to be combined with the background image when generating the vehicle-periphery image, may be specified uniquely by the image recognition. Therefore, the orientation of the parking space and the longitudinal direction of the vehicle image are compared and the fact that the vehicle 100 is oriented in substantially parallel to the parking space is detected depending on whether or not the both of them are parallel to each other.

Reference numeral 5 designates an approach detector 5 for detecting that at least part of the vehicle 100 is approaching into the parking space. The approach detector 5 includes an image recognizer 5a. The image recognizer 5a performs the image recognition processing for the images of the periphery of the vehicle shot by the respective cameras 1a to 1d or the vehicle-periphery image generated therefrom by the image processor 2a. The approach detector 5 utilizes the result of the image recognition processing to detect that at least part of the vehicle 100 is approaching into the parking space.

In other words, the approach detector 5 specifies the two parallel white lines or the yellow lines drawn in the longitudinal direction of the parking space by the approach detector 5. Then, the approach detector 5 confirms the positional relationship between the specified two lines and the vehicle image, which is to be combined with the background image when generating the vehicle-periphery image. Here, a line which connects ends of the two parallel boundaries is imagined, and when the vehicle image is overlapped with the imaginary line, it is determined that at least part of the vehicle 100 is approaching into the parking space. When a line which corresponds to the imaginary line is actually drawn in the parking space, the image recognizer 5*a* recognizes the line in question, so that whether or not the vehicle image is overlapped therewith (whether or not part of the line is hidden by the vehicle image) may be determined.

Reference numeral 6 designates a steering angle detector for detecting the steering angle of the steering wheel of the vehicle 100. The reference numeral 7 designates a display image switch or display controller, which controls the image processor to switch an image to be displayed in the display device 3 from the vehicle-periphery image to the rear view image when the three states of (1) the vehicle 100 is oriented substantially parallel to the parking space, (2) at least part of the vehicle 100 is approaching into the parking space is detected, and (3) the steering angle of the steering wheel is within a certain angular range are detected by the parallel detector 4, the approach detector 5, and the steering angle detector 6, respectively.

FIG. 4 is a drawing showing various states with respect to the parking space of the vehicle 100. As shown in FIG. 4A, when the vehicle 100 is about to enter in the parking space, the driver has a strong demand to view the positional relationship between the vehicle 100 and obstacles existing in front, rear, left and right. In this case, since none of the above-described conditions (1) to (3) is satisfied, the image processor 2*a* generates the vehicle-periphery image showing the entire periphery of the vehicle 100 and displays the same in the display device 3.

Figure 4A:
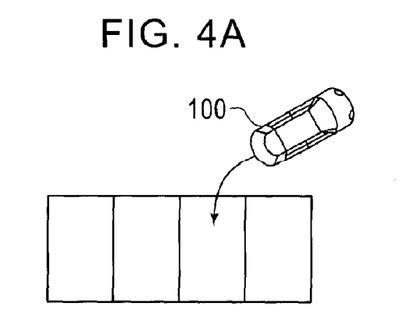
FIGS. 4A to 4D are drawings showing examples of various states of the vehicle with respect to the parking space.
Figure 4B:
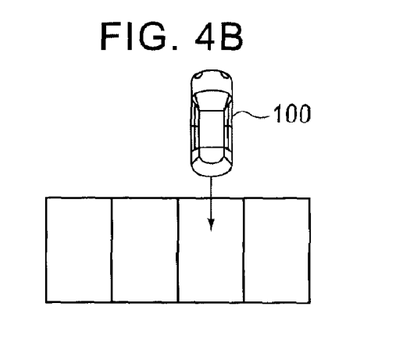

As shown in FIG. 4B, when the vehicle 100 is still apart from the parking space although the vehicle 100 is oriented substantially parallel to the parking space, the driver has a strong demand to know the positional relationship with respect to vehicles parked on the left and right sides accurately. In this case, since the condition (2) and, in some cases, the condition (3) as well is not satisfied, the image processor 2*a* generates the vehicle-periphery image and displays the same in the display device 3.

Figure 4C:
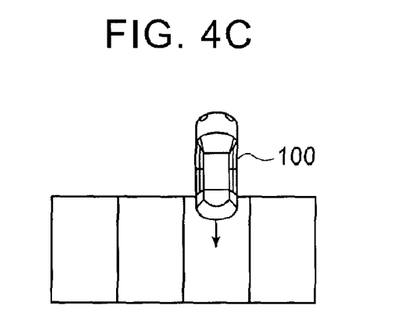

In contrast, when the vehicle 100 starts to approach into the parking space as shown in FIG. 4C, the vehicle 100 travels backward with the steering wheel at the original position, and hence the positional relationship with respect to the vehicles parked on the left and right sides is insignificant. Therefore, the driver has a strong demand to know the positional relationship with respect to the wheel stopper or wheel stop existing behind accurately. In this case, since the all conditions (1) to (3) described above are satisfied, the display image switch 7 controls the image processor 2*a* to switch the image to be displayed in the display device 3 from the vehicle-periphery image to the rear view image. The image processor 2*a* generates the rear view image accordingly, and displays the same in the display device 3.

Figure 4D:
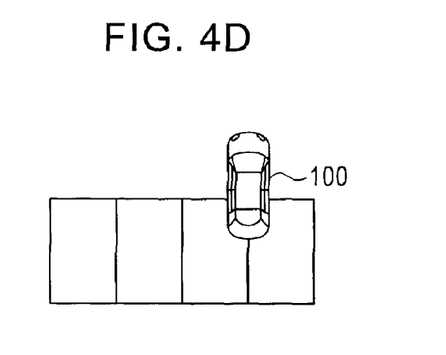

As shown in FIG. 4D, when the vehicle 100 is not placed within an area of the parking space where the driver wants to park although at least part of the vehicle 100 is approaching into the parking space, it is preferable that the positional relationship between the vehicle 100 and the entire periphery thereof is known. In this case, granted that the conditions (1) and (2) are satisfied, since the condition (3) is not satisfied, the image processor 2*a* generates the vehicle-periphery image and displays the same in the display device 3.

Figure 5:
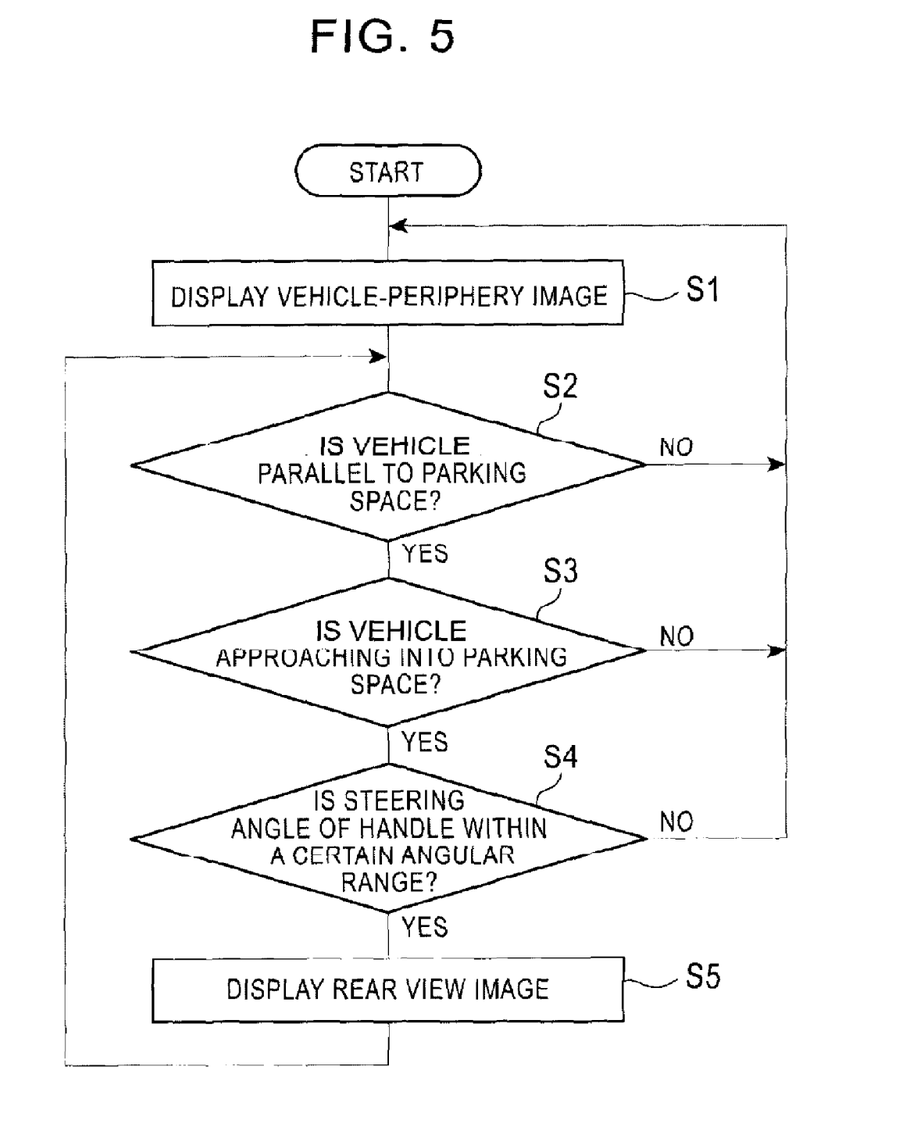
FIG. 5 is a flowchart showing an example of operation of the vehicle-periphery image generating apparatus in this embodiment.

Subsequently, the operation of the vehicle-periphery image generating apparatus in this embodiment configured as described above will be described. FIG. 5 is a flowchart showing an example of operation of the vehicle-periphery image generating apparatus in this embodiment. In FIG. 5, the display image switch or display controller 7 controls the image processor 2*a* to generate the vehicle-periphery image. Accordingly, the image processor 2*a* generates the vehicle-periphery image viewed from the virtual point of view above the vehicle 100 on the basis of the images of the periphery of the vehicle shot by the respective cameras 1*a* to 1*d* installed at the different positions of the vehicle, and displays the same over the full screen of the display device 3 (Step S1).

The parallel detector 4 determines whether or not the vehicle 100 is oriented substantially parallel to the parking space (Step S2). When the fact that the vehicle 100 is oriented substantially parallel to the parking space is not detected, the procedure goes back to Step S1, and continuously displays the vehicle-periphery image in the display device 3. On the other hand, when the fact that the vehicle 100 is oriented substantially parallel to the parking space is detected, the approach detector 5 determines whether or not at least part of the vehicle 100 is approaching into the parking space (Step S3).

When the fact that at least part of the vehicle 100 is approaching into the parking space is not detected, the procedure goes back to Step S1, and continuously displays the vehicle-periphery image in the display device 3. On the other hand, when the fact that at least part of the vehicle 100 is approaching into the parking space is detected, the steering angle detector 6 determines whether or not the steering angle of the steering wheel of the vehicle 100 is within the certain angular range (Step S4).

When the fact that the steering angle of the steering wheel of the vehicle 100 is within the certain angular range is not detected, the procedure goes back to Step S1, and continuously displays the vehicle-periphery image in the display device 3. On the other hand, when the fact that the steering angle of the steering wheel of the vehicle 100 is within the certain angular range is detected, the display image switch 7 controls the image processor 2*a* to generate the rear view image. Accordingly, the image processor 2*a* generates the rear view image on the basis of the image behind the vehicle shot by the rear camera 1*d* and displays the same over the full screen of the display device 3 (Step S5). Subsequently, the procedure goes back to Step S2.

As described in detail above, in this embodiment, the vehicle-periphery image is normally displayed over the full screen of the display device 3, and when the conditions (1) to (3) described above are satisfied, the rear view image is displayed over the full screen of the display device 3. Therefore, the display of the vehicle-periphery image and the display of the rear view image may be switched as needed according to the state of the vehicle 100 with respect to the parking space. Accordingly, the images optimal for the respective scenes are displayed largely, and for example, when the driver wants to know the positional relationship between the vehicle 100 and the wheel stoppers located behind thereof accurately, the rear view image in which the periphery of the wheel stops are shown in detail may be displayed largely on the screen.

In the embodiment shown above, although an example in which the parallel detector 4, the approach detector 5 and the steering angle detector 6 are provided, and the rear view image is displayed when all the conditions (1) to (3) are satisfied has been described, the invention is not limited thereto. In other words, a configuration in which display of the image is switched from the vehicle-periphery image to the rear view image when at least one of the conditions (1) and (2) is satisfied is also applicable. Alternatively, a configuration in which display of the image is switched from the vehicle-periphery image to the rear view image when one of a combination of the conditions (1) and (3) or a combination of the conditions (2) and (3) is satisfied is also applicable.

For example, when considering a scene of parallel parking, the steering angle of the steering wheel is not within the predetermined angle even when the vehicle 100 is started to approach into the parking space. When the vehicle 100 is almost accommodated within the parking space, the steering angle of the steering wheel is not within the predetermined angle in many cases. In this case, switching from the vehicle-periphery image to the rear view image is not achieved if the condition (3) is effective. Therefore, the steering angle detector 6 is not provided so that the switching between the vehicle-periphery image and the rear view is achieved only under the conditions (1) and (2).

In the case of the parallel parking, a plurality of the parking spaces are arranged longitudinally at regular distances, and hence there is no case that the plurality of parking spaces are arranged side-by-side without the distances. Therefore, the arrangement of the parking spaces or presence or absence of the vehicles parked on the left and right sides of the parking space where the driver wants to park is determined by the image recognition, so that whether or not it is the parallel parking is determined. When it is determined to be the parallel parking, switching between the vehicle-periphery image and the rear view image is performed only under the conditions (1) and (2), while when it is determined not to be the parallel parking, the switching between the vehicle-periphery image and the real view image may be performed under the conditions (1) to (3). In this case, the steering angle detector 6 is not omitted.

It is also possible to perform the switching between the vehicle-periphery image and the rear view image only under the conditions (2) and (3) considering a case of parking in a garage with a roof. In this case, the parallel detector 4 is omitted. The difference between the garage with a roof and the normal parking space can easily be discriminated by the image recognition. Therefore, a configuration in which whether or not it is the garage is determined by the image recognition and, the switching between the vehicle-periphery image and the rear view image is performed only under the condition (2) and (3) when it is determined to be the garage, and the switching between the vehicle-periphery image and the rear view is performed under the conditions (1) to (3) when it is determined not to be the garage may also be applicable. In this case, the parallel detector 4 is not omitted.

In the example shown above, the switching to the rear view image is not performed in the state shown in FIG. 4B and is performed in the state shown in FIG. 4C. However, when earlier timing of the switching to the rear view image is desired, the switching between the vehicle-periphery image and the rear view may be performed only under the conditions (1) and (3). In this case, the approach detector 5 is omitted. When further earlier timing of the switching to the rear view image is desired, the switching between the vehicle-periphery image and the rear view may be performed only under the condition (1). When the switching to the rear view image at the timing when part of the vehicle 100 enters the parking space is desired, the switching between the vehicle-periphery image and the rear view may be performed only under the condition (2).

In the embodiment shown above, an example in which the parallel detector 4 includes the image recognizer 4a so as to detect whether or not the vehicle 100 is oriented substantially parallel to the parking space by the image recognition is described. However, the invention is not limited thereto.

Figure 6:
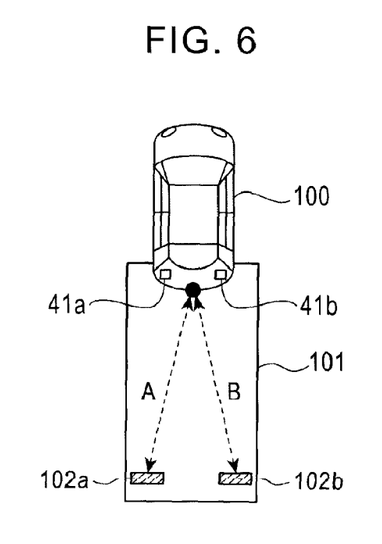
FIG. 6 is a drawing showing another example of the configuration of a parallel detector in this embodiment.

For example, as shown in FIG. 6, the parallel detector 4 includes distance sensors 41a, 41b such as a radio detection and ranging installed at the rear of the vehicle 100 for measuring distances A and B from a predetermined position of the vehicle 100 to two left and right wheel stoppers 102a and 102b in the parking space 101. When there are not the wheel stoppers 102a and 102b and a wall or the like is provided behind, distances A and B to predetermined two points assumed on the wall are measured. The predetermined position of the vehicle 100 is preferably a center point of the width of the vehicle 100. The parallel detector 4 detects that the vehicle 100 is oriented substantially parallel to the parking space 101 when it is detected that the distances A and B from the vehicle 100 to the two left and right wheel stoppers 102a and 102b are substantially the same.

Figure 7A:
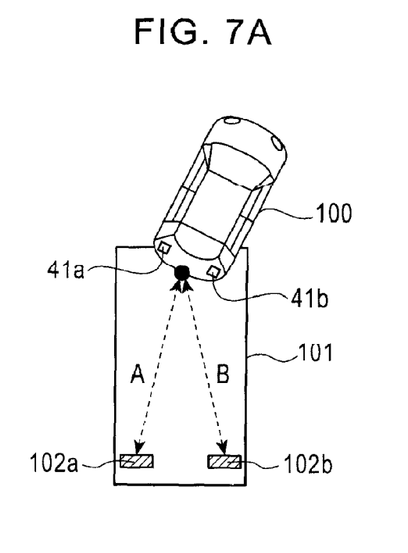
FIG. 7 is a drawing showing another example of the configuration of the parallel detector in this embodiment.
Figure 7B:
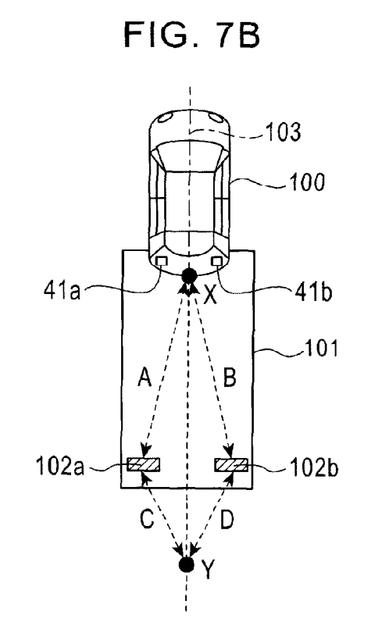

In this system, as shown in FIG. 7A, even though the vehicle 100 is not substantially parallel to the parking space 101 in fact, the distances A and B from the vehicle 100 to the two wheel stoppers 102a and 102b may be substantially the same. Therefore, as shown in FIG. 7B, the distances between given two points X and Y on a straight line including a center axis 103 in the fore-and-aft direction (longitudinal direction) of the vehicle 100 and the two left and right wheel stoppers 102a and 102b are measured respectively.

Then, when the fact that the distances A and B between the two left and right wheel stoppers 102a and 102b and the given point X on the straight line including the center axis 103 are substantially the same, and distances C and D between the two left and right wheel stoppers 102a and 102b and the other given point Y on the straight line including the center axis 103 are substantially the same is detected, it is detected that the vehicle 100 is oriented substantially parallel to the parking space 101. In this arrangement, the fact that the vehicle 100 is oriented substantially parallel to the parking space 101 is detected without error.

Figure 8:
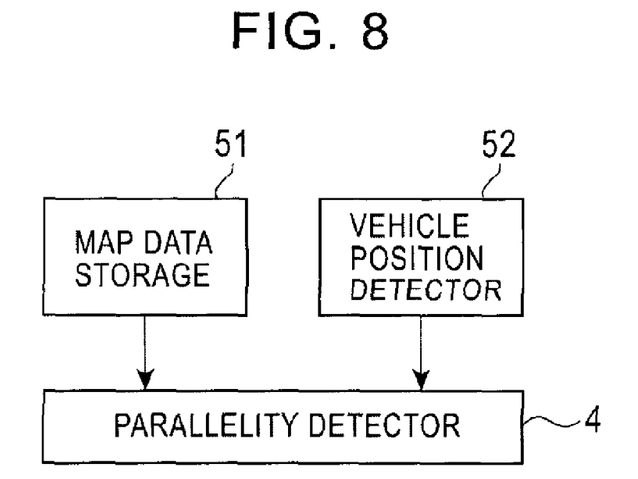
FIG. 8 is a drawing showing another example of the configuration of the parallel detector in this embodiment.

As another example of the parallel detector 4, a configuration shown in FIG. 8 is also applicable. In FIG. 8, reference numeral 51 designates a map data storage for storing a map data including positional information on a parking area and the respective parking spaces provided in the parking area. The map data storage 51 is provided, for example, in a car navigation system, and is adapted to store the map data read from a map recording medium such as DVD-ROM or the like, not shown, temporarily.

Reference numeral 52 designates a vehicle position detector for detecting the current position and the orientation of the vehicle 100. The vehicle position detector 52 is also provided in the car navigation system and includes, for example, a self-navigation sensor, a GPS receiver, a position calculating CPU. The self-navigation sensor includes a vehicle-speed sensor (distance sensor) for detecting the traveled distance of the vehicle by generating one pulse per a predetermined distance of travel and a angular-speed sensor (relative orientation sensor) such as a vibration gyrocompass for detecting the rotational angle (orientation of movement) of the vehicle. The self-navigation sensor detects the relative position and the orientation of the vehicle by the vehicle-speed sensor and the angular-speed sensor.

The position calculating CPU calculates the absolute position of the vehicle (estimated position of the vehicle) and the orientation of the vehicle on the basis of data on the relative position and orientation of the vehicle received from the self-navigation sensor. The GPS receiver receives radio waves sent from a plurality of GPS satellites by a GPS antenna and calculates the absolute position and orientation of the vehicle through three-dimensional positioning information and two-dimensional positioning information (the vehicle orientation is calculated on the basis of the position of the vehicle at the current moment and the position of the vehicle at one sampling time $\Delta T$ before).

The parallel detector 4 compares the positional information of the parking space stored in the map data storage 51 and the current position and orientation of the vehicle 100 detected by the vehicle position detector 52, so that the fact that the vehicle 100 is oriented substantially parallel to the parking space is detected.

In the embodiment shown above, an example in which the approach detector 5 includes the image recognizer 5a and whether or not the part of the vehicle 100 is already in the parking space is detected by the image recognition has been described. However, the invention is not limited thereto.

For example, when parking in the garage with a roof in the daytime, the vehicle 100 travels backward and starts to enter the garage, the luminance of the image shot by the rear camera 1d is significantly reduced in comparison with the luminance of the images shot by the other cameras 1a to 1c. Therefore, the approach detector 5 is provided with a luminance detector for detecting the luminance of the images of the periphery of the vehicle shot by the respective cameras 1a to 1d instead of the image recognizer 5a. Then, when the fact that there is a difference of at least a certain value in luminance among the images of the periphery of the vehicle is detected, more specifically, when the fact that there is a difference of at least the certain value in luminance is detected between the image shot by the rear camera 1d and the images shot by the other cameras 1a to 1c, the fact that at least part of the vehicle 100 is approaching into the garage is detected.

When the image processor 2a generates the vehicle-periphery image using the images of the periphery of the vehicle shot by the respective cameras 1a to 1d, the suitable exposures of the respective cameras 1a to 1d are calculated so that the luminance of the front, rear, left and right of the vehicle matches as much as possible over the generated vehicle-periphery image as a whole. Therefore, the luminance of the image shot by the rear camera 1d is significantly reduced in comparison with the luminance of the images shot by the other cameras 1a to 1c, the difference in exposure amount between the rear camera 1d and the other cameras 1a to 1c increases.

Therefore, as a configuration of the approach detector 5, an exposure detector for detecting the exposures of the respective cameras 1a to 1d may be provided instead of the image recognizer 5a. Then, a configuration in which the fact that at least part of the vehicle 100 is approaching into the garage is detected when the difference of at least the certain value in exposure is detected between the rear camera 1d and the other cameras 1a to 1c, more specifically, when the difference of at least the certain value in exposure is detected between the rear camera 1d and the other cameras 1a to 1c is also applicable.

Alternatively, a configuration in which the distance sensors 41a and 41b such as a radio detection and ranging installed at the rear of the vehicle 100 as in FIG. 6 so that the fact that at least part of the vehicle 100 is approaching into the parking space 101 is determined when the distance from the predetermined position of the vehicle to the wheel stoppers 102a and 102b or the rear wall is reduced to a predetermined value or smaller is also applicable. When the distance sensors 41a and 41b are used, the fact that the vehicle is oriented substantially parallel to the parking space 101 and the fact that part of the vehicle 100 enters the parking space 101 are detected only by the distance sensors 41a and 41b.

Figure 9:
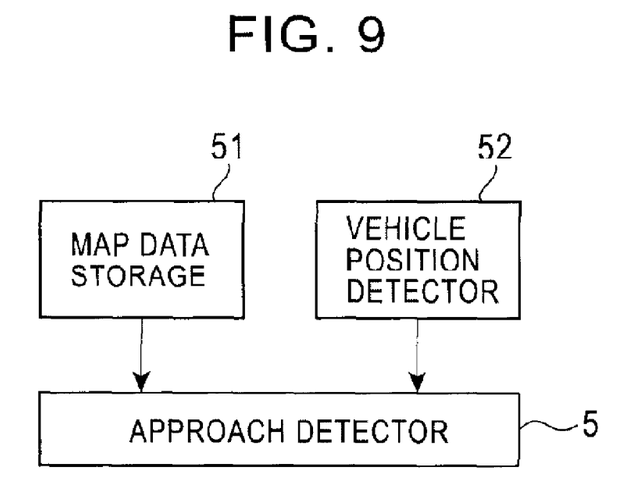
FIG. 9 is a drawing showing another example of the configuration of an approach detector in this embodiment.

As another example of the approach detector 5, a configuration shown in FIG. 9 is also applicable. In FIG. 9, components having the same functions as the components shown in FIG. 8 are represented by the same reference numerals. In the example shown in FIG. 9, the approach detector 5 detects that at least part of the vehicle is approaching into the parking space by comparing the positional information of the parking space stored in the map data storage 51 and the current position of the vehicle 100 detected by the vehicle position detector 52.

In the embodiment shown above, an example in which the rear view image is displayed as the additional image has been described. However, the invention is not limited thereto. For example, a side view image generated in the same manner as the rear view image on the basis of the image shot by the side camera 1b or 1c, or a front view image generated in the same manner as the rear view image on the basis of the image shot by the front camera 1a may also be applicable.

The embodiment shown above are not more than detailed examples for implementing the invention, and technical scope of the invention should not be understood to be limited thereto. In other words, the invention may be modified in various manners without departing from the sprit or the principal characteristics thereof. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A vehicle-periphery image generating apparatus that generates a vehicle-periphery image viewed from a virtual point of view above a vehicle and an additional image different from the vehicle-periphery image based upon one or more images of a periphery of the vehicle, the images of the periphery acquired by a plurality of image pickup devices installed at different positions on the vehicle comprising:
    a parallel detector operable to detect that the vehicle is oriented substantially parallel to a parking space; and
    a display controller operable to switch an image displayed from the vehicle-periphery image to the additional image when the parallel detector detects that the vehicle is oriented substantially parallel to the parking space.

2. The vehicle-periphery image generating apparatus according to claim 1, wherein the parallel detector comprises an image recognizer operable to (1) perform image recognition processing on the images of the periphery of the vehicle or the vehicle-periphery image generated therefrom and (2) detect that the vehicle is oriented substantially parallel to the parking space through the image recognition processing.

3. The vehicle-periphery image generating apparatus according to claim 1, wherein the parallel detector comprises a distance sensor installed at a rear of the vehicle operable to determine that the vehicle is oriented substantially parallel to the parking space when a first distance from the vehicle to a left wheel stop behind the vehicle and a second distance from the vehicle to a right wheel stop behind the vehicle are detected to be substantially the same.

4. The vehicle-periphery image generating apparatus according to claim 1, wherein the parallel detector comprises a distance sensor installed at a rear of the vehicle operable to determine that the vehicle is oriented substantially parallel to the parking space when two distances between a left and a right wheel stop behind the vehicle and a given point on a straight line including a center axis of the vehicle in a fore-and-aft direction are detected to be substantially the same, and simultaneously, the distances between the left and right wheel stops and another given point on the straight line are detected to be substantially the same.

5. The vehicle-periphery image generating apparatus according to claim 1, wherein the parallel detector (1) comprises a map data storage unit operable to store map data including positional information associated with the parking space, and a vehicle position detector operable to detect a current position and orientation of the vehicle, and (2) determines that the vehicle is oriented substantially parallel to the parking space by comparing the positional information associated with the parking space and the current position and orientation of the vehicle.

6. The vehicle-periphery image generating apparatus according to claim 1 further comprising an approach detector operable to detect that at least part of the vehicle is entering the parking space,
wherein the display controller switches the image displayed from the vehicle-periphery image to the additional image when the parallel detector detects that the vehicle is oriented substantially parallel to the parking space and simultaneously, the approach detector detects that at least part of the vehicle is entering the parking space.

7. The vehicle-periphery image generating apparatus according to claim 1 further comprising a steering angle detector operable to detect a steering angle of a steering wheel of the vehicle,
wherein the display controller switches the image displayed from the vehicle-periphery image to the additional image when the parallel detector detects that the vehicle is oriented substantially parallel to the parking space and simultaneously, the steering angle detector detects that the steering angle is within a certain angular range.

8. The vehicle-periphery image generating apparatus according to claim 1 further comprising an approach detector operable to detect that at least part of the vehicle is entering the parking space, and
a steering angle detector operable to detect a steering angle of a steering wheel of the vehicle,
wherein the display controller switches the image displayed from the vehicle-periphery image to the additional image when the parallel detector detects that the vehicle is oriented substantially parallel to the parking space, the approach detector detects that at least part of the vehicle is entering the parking space and, simultaneously, the steering angle detector detects that the steering angle is within a certain angular range.

9. A vehicle-periphery image generating apparatus that generates a vehicle-periphery image viewed from a virtual point of view above a vehicle and an additional image different from the vehicle-periphery image based upon one or more images of a periphery of the vehicle, the images of the periphery acquired by a plurality of image pickup devices installed at different positions on the vehicle comprising:
an approach detector operable to detect that at least part of the vehicle is entering a parking space; and
a display controller operable to switch a display of an image from the vehicle-periphery image to the additional image when the approach detector detects that at least part of the vehicle is entering the parking space.

10. The vehicle-periphery image generating apparatus according to claim 9, wherein the approach detector comprises an image recognizer operable to perform image recognition processing on an image of the periphery of the vehicle or the vehicle-periphery image generated therefrom for detecting that at least part of the vehicle is entering the parking space.

11. The vehicle-periphery image generating apparatus according to claim 9, wherein the approach detector (1) comprises a luminance detector operable to detect the luminance of the images of the periphery of the vehicle acquired by the plurality of image pickup devices, and (2) detects that at least part of the vehicle is entering the parking space when a difference of at least a certain value in luminance among the images of the periphery of the vehicle is detected.

12. The vehicle-periphery image generating apparatus according to claim 9, wherein the approach detector (1) comprises an exposure detector operable to detect the exposures of the plurality of the image pickup devices, and (2) detects that at least part of the vehicle is entering the parking space when the difference of at least a certain value in exposure is detected among the plurality of image pickup devices.

13. The vehicle-periphery image generating apparatus according to claim 9, wherein the approach detector (1) comprises a map data storage unit operable to store map data including positional information associated with the parking space, and a vehicle position detector operable to detect the current position of the vehicle, and (2) detects that at least part of the vehicle is entering the parking space by comparing the positional information associated with the parking space and the current position of the vehicle.

14. The vehicle-periphery image generating apparatus according to claim 9 further comprising a steering angle detector operable to detect a steering angle of a steering wheel of the vehicle,
wherein the display controller switches the image displayed from the vehicle-periphery image to the additional image when the approach detector detects that at least part of the vehicle is entering the parking space and, simultaneously, the steering angle detector detects that the steering angle is within a certain angular range.

15. An image switching method comprising:
generating a vehicle-periphery image viewed from a virtual point of view above a vehicle on the basis of images of a periphery of the vehicle acquired by a plurality of image pickup devices installed at different positions on the vehicle;
displaying the vehicle-periphery image on a display;
determining whether or not the vehicle is oriented substantially parallel to a parking space; and
switching the display to an additional image different from the vehicle-periphery image when the vehicle is oriented substantially parallel to the parking space, the additional image being based upon at least one of the images of the periphery of the vehicle.

16. The image switching method according to claim 15 comprising:
determining whether or not at least part of the vehicle is entering the parking space; and
switching the display from the vehicle-periphery image to the additional image when the vehicle is oriented substantially parallel to the parking space and, simultaneously, at least part of the vehicle is entering the parking space.

17. The image switching method according to claim 15 comprising:
detecting a steering angle of a steering wheel of the vehicle; and
switching the display from the vehicle-periphery image to the additional image when the vehicle is oriented substantially parallel to the parking space and, simultaneously, the steering angle is within a certain angular range.

18. The image switching method according to claim 15 comprising:

- determining whether or not at least part of the vehicle is entering the parking space;
- detecting the steering angle of a steering wheel of the vehicle; and
- switching the display from the vehicle-periphery image to the additional image when the vehicle is oriented substantially parallel to the parking space, at least part of the vehicle is entering the parking space and, simultaneously, the steering angle is within a certain angular range.

19. An image switching method comprising:

- generating a vehicle-periphery image viewed from a virtual point of view above the vehicle on the basis of images of the periphery of a vehicle acquired by a plurality of image pickup devices installed at different positions on the vehicle;
- displaying the vehicle-periphery image on a display;
- determining whether or not at least part of the vehicle is entering a parking space; and
- switching the display to an additional image different from the vehicle-periphery image when at least part or the vehicle is entering the parking space, the additional image being based upon at least one of the images of the periphery of the vehicle.

20. The image switching method according to claim 19, comprising detecting a steering angle of a steering wheel of the vehicle, wherein, the display is switched to the additional image different from the vehicle-periphery image when at least part of the vehicle is entering the parking space and, simultaneously, the steering angle is within a certain angular range.

* * * * *